UNITED STATES PATENT OFFICE.

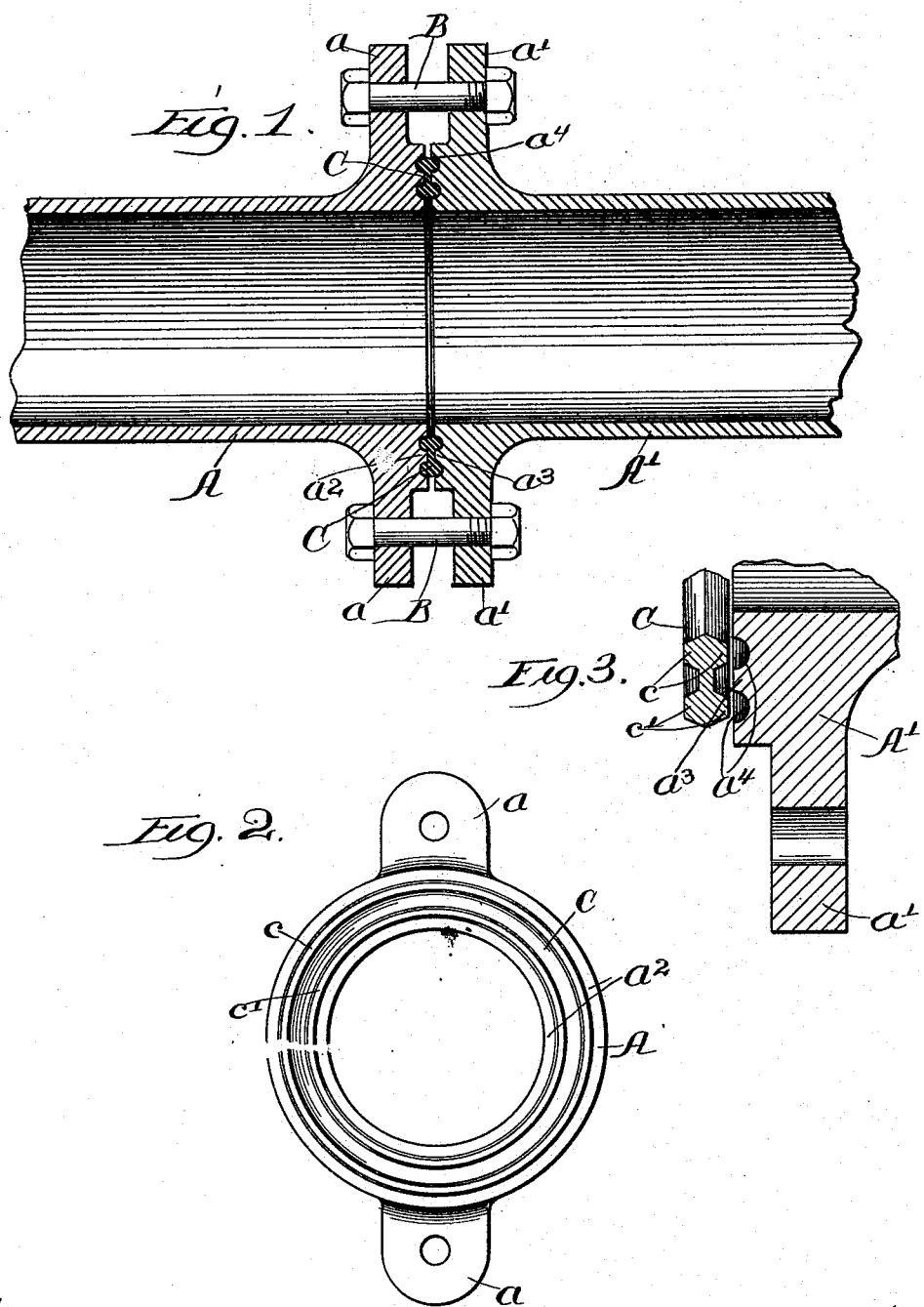

LOVELL M. ROUSE, OF CHICAGO, ILLINOIS.

STEAM-TIGHT COUPLING.

SPECIFICATION forming part of Letters Patent No. 508,765, dated November 14, 1893.

Application filed March 28, 1893. Serial No. 467,935. (No model.)

*To all whom it may concern:*

Be it known that I, LOVELL M. ROUSE, a citizen of the United States of America, residing at Chicago, in the county of Cook and State of Illinois, have invented certain new and useful Improvements in Steam-Tight Couplings, of which the following is a specification.

My invention relates to certain improvements in steam-tight couplings having for their object the provision of means whereby a steam-tight joint may be made between the ends of two pieces of pipe, or other structures, in their rough state as they come from the foundry.

To this end the improvement consists in the combination with the two meeting surfaces suitably prepared of a soft metal gasket of a peculiar form and adapted to be clamped between the two surfaces and partially molded thereto.

My invention is illustrated in the drawings by means of three figures, of which—

Figure 1 is a longitudinal diametrical section of the ends of two pieces of pipe showing a complete coupling. Fig. 2 is a face view of one of said ends with the gasket applied thereto, and Fig. 3 is an enlarged fragment of Fig. 1.

Referring to the drawings, the two ends of the pieces of pipe are lettered A, A', and are clamped tightly together by means of bolts, B, passing through ears, $a$, $a'$, upon the ends of the pieces of pipe. The extreme ends of the pipes have enlarged meeting surfaces, $a^2$, $a^3$, in which are formed annular grooves, $a^4$, preferably concave and concentric. A gasket, C, of soft and yielding metal, as, for instance, lead, is formed with annular ridges $c$, $c'$, upon its opposite sides adapted to rest in the concave grooves in the meeting surfaces of the pipes. These annular ridges are not, however, made to conform to the concave grooves, but have angular outlines in cross-section, so that abrupt edges of the soft metal are presented to the concave surfaces of the grooves; and when pressure is brought to bear upon the same, these abrupt edges are forced much more easily and readily into the depression and unevennesses of the grooves than would be possible if the ridges fitted the grooves and furnished a considerable bearing surface. By this means a perfectly steam-tight joint may be made with but a moderate amount of pressure without any finishing work upon the meeting surfaces after they leave the molds.

It is obvious that there may be a certain amount of variation in the shape of the annular ridges upon the gasket and also the grooves in the ends of the pipes. It is only essential that the ridges be made with abrupt angles and the grooves be made not to conform to the ridges.

I claim as new and desire to secure by Letters Patent—

A coupling consisting of a soft metal gasket provided with annular ridges having angular outlines in cross-section, and two members having opposing surfaces provided with annular grooves not conforming in outline to the ridges and means for clamping said members together; substantially as described.

LOVELL M. ROUSE.

Witnesses:
CHARLES O. SHERVEY,
A. I. H. EBBESEN.